EDWARD RICHARD PLAYLE, OF JERSEY CITY, NEW JERSEY.

Letters Patent No. 85,958, dated January 19, 1869.

IMPROVEMENT IN CONVERTING IRON INTO STEEL.

The Schedule referred to in these Letters Patent and making part of the same

*To all whom it may concern:*

Be it known that I, EDWARD RICHARD PLAYLE, of Jersey City, in the county of Hudson, in the State of New Jersey, have discovered a new useful Ingredient for Killing the Sulphur and Phosphorus in Iron, and Converting it into Steel; and I do hereby declare that the following is a full and exact description thereof.

The nature of my discovery or invention is as follows:

First, I take common rock-weed, one ton. Press the fluid out in any known way. Then boil or evaporate down to crystal or salts.

This product I call a chemical salt or physic, of which I put one and one-half ounce into each crucible of iron of sixty pounds, to be converted into steel.

This ingredient may be used with other known carbon or flux.

I do not claim charcoal and manganese for making steel; but

What I do claim, and desire to secure by Letters Patent, is—

1. The use of the salts, obtained from the source herein described, with or without carbon or flux, for converting iron into steel.

2. The use of the raw material herein described, for converting iron into steel.

E. R. PLAYLE.

Witnesses:
 J. E. ATWOOD,
 JAMES B. VREDENBURGH.